United States Patent [19]

Nooyen

[11] 4,175,568
[45] Nov. 27, 1979

[54] MATERIAL FLOW RETARDERS
[75] Inventor: Ray E. Nooyen, Leola, Pa.
[73] Assignee: Sperry Rand Corporation, New Holland, Pa.
[21] Appl. No.: 924,546
[22] Filed: Jul. 14, 1978
[51] Int. Cl.² ............................................. A01F 12/20
[52] U.S. Cl. .................................. 130/27 T; 56/14.6
[58] Field of Search ......... 56/14.6; 130/27 R, 27 HA, 130/27 H, 27 HF, 27 Q, 27 T

[56] References Cited

U.S. PATENT DOCUMENTS

| 1,193,751 | 8/1916 | Bangen | 130/27 Q |
| 1,386,298 | 8/1921 | Winslow | 130/27 Q |
| 3,122,499 | 2/1964 | Witzel et al. | 130/27 T |
| 3,626,472 | 12/1971 | Rowland-Hill | 130/27 T |
| 3,699,121 | 6/1972 | Rowland-Hill | 130/27 T |
| 3,742,686 | 7/1973 | Rowland-Hill | 130/27 T |
| 3,828,794 | 8/1974 | Gochanour et al. | 130/27 T |
| 3,982,549 | 9/1976 | DePauw et al. | 130/27 T |
| 3,995,645 | 12/1976 | Rowland-Hill | 130/27 T |

Primary Examiner—Russell R. Kinsey
Attorney, Agent, or Firm—Ralph D'Alessandro; Frank A. Seemar; John B. Mitchell

[57] ABSTRACT

In a crop harvesting and threshing machine of the type utilizing axial flow threshing and separation there is provided about the upper portions of the rotor casing axial flow inhibiting members rearwardly of axial flow facilitating members. The inhibiting members are arranged in a reverse pattern to the facilitating members so that crop material transported axially about the threshing and separating rotors is decelerated and deflected into a discharge opening without passing further rearwardly, thus preventing the enwrapping of crop material about the rotatable shafts of the rotor.

8 Claims, 4 Drawing Figures

MATERIAL FLOW RETARDERS

BACKGROUND OF THE INVENTION

This invention relates generally to crop harvesting and threshing machines, more commonly known as combines, and more particularly to the type of machine commonly referred to as an axial flow type combine wherein the crop material passes axially through an elongate casing and about each threshing and separating rotor contained therein. Specifically, the invention is concerned with material flow inhibiting means at the rear of the separating portion of the casing that decelerate and deflect the crop material to and through a discharge area. This invention is equally applicable to an axial flow type combine utilizing either a single threshing and separating rotor or double threshing and separating rotors.

The conventional type combines previously used pass the crop material to be threshed between a rotary cylinder and a stationary concave in a direction that was normal to the axis of the rotating cylinder and parallel with the longitudinal axis of the combine frame. In this system much of the grain contained in the crop material fed to the cylinder and the concave passes through the concave as threshed grain. The remainder of the material is conveyed to separating elements of the combine that traditionally include reciprocating or oscillating straw walkers, return pans, and chaffer sieves. Such conventional combines suffer from the major disadvantage of having a threshing capacity that is limited by the single pass of the crop material about the threshing cylinder. Combines of the axial flow type, in contrast, utilize single or dual threshing and separating rotors that permit the crop material to pass over the concave during the threshing process three or more times. This increased exposure to the rotors during the threshing process permits axial flow type combines to increase the amount of grain obtained from any crop passed therethrough when compared with conventional combines.

A feeder housing elevator on the front of the axial flow type combine delivers the cut crop material to the front or infeed end of the threshing and separating rotors. In one variation of the type of combine in which the instant invention can be utilized there are two rotors of generally cylindrical configuration which have a short infeed auger mounted to each of their forward ends. The rotors turn in opposite directions in parallel housings within a combined rotor casing and have separate threshing and separating portions. The threshing portion of each rotor or threshing cylinder has as many as four rasp bars fastened thereto in closely mounted pairs. Open type concaves are individually adjustable and sit beneath each rotor within the casing. The separating portion of the rotors have separator blades fixed to each of the two rotors to continue separating the grain from the crop material as the material moves rearwardly. The rearward movement of the crop material is aided by helical fins fixed to the upper portions of the rotor casing. At the rear of the rotors crop material is deflected into a transverse discharge beater and an auxilliary separating area which serve to remove the remaining grain and expel the crop material residue at the rear of the combine. These features are all shown in greater detail in prior U.S. Pat. Nos. 3,626,472, issued Dec. 7, 1971, and 3,742,686, issued July 3, 1973 both to Rowland-Hill.

When axial flow type combines are used in certain leguminous or grassy crops such as alfalfa, timothy or even clover there is a potential for the crop material to wrap about the rotating shafts and attached hubs or sleeves about which the threshing and separating rotors turn. Should the crop material continue to be transported rearwardly until it contacts the bulkhead at the extreme rear of the separating portion of the rotors crop material could become so tightly wrapped about the shafts and hubs of the rotors as to impair the operational characteristics of the overall machine. This operational impairment from wrapping potentially could cause eventual damage to the operating components of the rotors by breaking the seals to the rotor gear boxes, cause engine stallouts by binding the rotors so tightly that they cannot turn, or, at the least, prove to be extremely difficult to untwine or disentangle.

The foregoing problems are solved in the design of the machine comprising the present invention by decelerating the axial flow of crop material rearwardly about the threshing and separating rotors and by deflecting crop material into the discharge opening leading to the discharge beater paddle and beater case.

SUMMARY OF THE INVENTION

It is a principal object of the present invention to provide in a combine of the axial flow type axial flow material inhibiting means at the rearmost portion of the threshing and separating rotor casing to decelerate the movement of crop material rearwardly after leaving the threshing portion of the rotors so that crop material will not continue rearwardly until it strikes the bulkhead into which are mounted the rotating rotor shafts.

It is another object of the present invention to provide deflecting means attached to the rotor casing near the discharge opening to cause the rearwardly moving crop material to be deflected down into the discharge opening for further processing by the beater paddle and beater grates in an auxilliary separating area.

It is a further object of the present invention to provide a simple, low cost mechanism that will preclude damage from occurring to the operating components of the threshing and separating rotors in an axial flow type combine by preventing crop material from becoming wrapped about the rotating shafts and attached hubs or sleeves of the rotors.

These and other objects and advantages are obtained by providing apparatus in a crop harvesting and threshing machine of the type utilizing axial flow threshing and separation by providing about the upper portions of the rotor casing axial flow inhibiting means rearwardly of axial flow facilitating means. The inhibiting means are arranged in a reverse pattern to the facilitating means so that crop material transported axially about the threshing and separating rotors is decelerated and deflected into a discharge opening without passing further rearwardly, thus preventing the enwrapping of crop material about the rotatable shafts and hubs or sleeves of the rotors.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
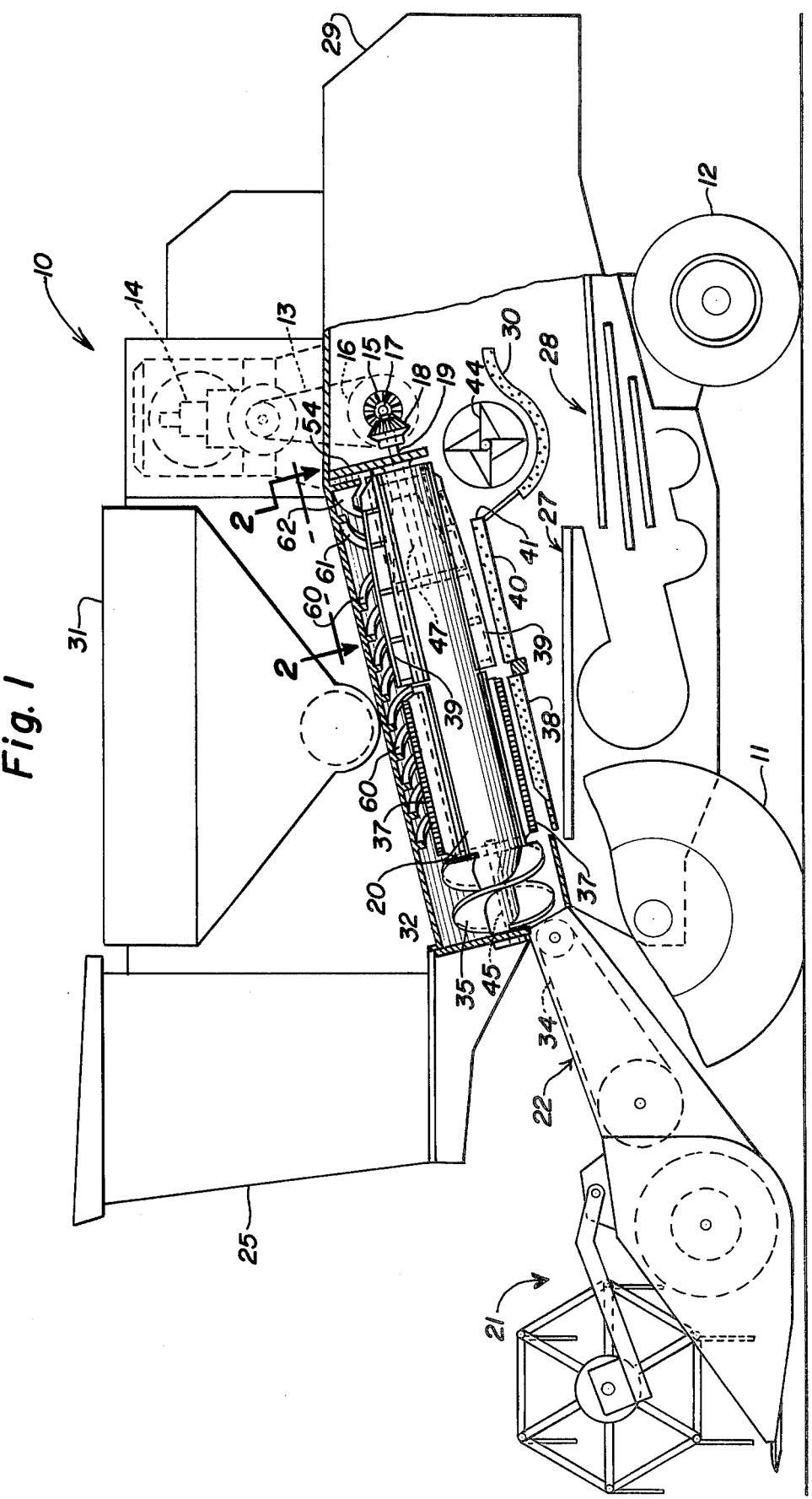
FIG. 1 is a side elevation view of a crop harvesting and threshing machine with portions broken away and shown in section to show the threshing and separating areas of a rotor.

Referring to FIG. 1, there is shown a combine in a side elevation view with the critical portions illustrated in a fragmentary manner by having their side coverings cut away and further illustrated in a partially sectional view. As can be seen, the combine 10 has a mobile frame mounted to a pair of primary driving wheels 11 in front and a smaller pair of steerable wheels 12 in the rear. The combine is powered by an engine 14, usually a diesel engine of relatively high horsepower. The engine 14 is mounted to the upper portion of the combine in suitable fashion and, by means of belts or sprocket chains 13, is connected to gear 15 via a sheave or sprocket 16 and a rotatable shaft 17. Gear 15 is in turn connected to bevel gear 18 that connects to one end of drive shaft 19 about which rotor 20 turns.

The combine 10 has a header 21 and an infeed housing 22 mounted to the front. The combine 10 has a main frame or housing 24 that internally supports the two threshing and separating rotors 20, only one of which is shown in FIG. 1. The operator's cab 25 extends forwardly over the front of the main frame 24 and atop the infeed housing 22. The main frame 24 also supports the grain pan and the grain cleaning means, indicated generally by the numerals 27 and 28, respectively. The rear housing 29 encloses the discharge beater grate assembly 30 (only partially shown). Grain tank 31 is mounted centrally atop the combine 10.

Both of the rotors 20 are enclosed in a rotor casing 32 and both the rotors and the casing are divided into threshing and separating portions. The inlet area of the threshing portions of the casing 32 is adjacent the infeed housing 22 with its crop elevator 34, as seen in FIG. 1. The inlet area of the rotor casing 32 has the pair of rotors 20 with their auger flightings 35 attached to its forwardmost end. The auger flightings 35 serve to deliver the stream of crop material brought from the header 21 through the infeed housing 22 by the crop elevator 34 rearwardly into contact with the rasping means 37 that are fastened to and generally define the threshing portions of the rotors 20. The rasping means 37 cooperatively interact with concaves 38, which are mounted generally beneath each of the cylindrically shaped rotors 20 in the lower portion of the elongated rotor casing 32. The concaves 38 are of the open type to permit shelled or threshed crop material to pass therethrough. The shelled or threshed material is then received upon the grain pan 27. The grain pan 27 then functions in a conventional manner to permit the grain or other crop material to be sifted and then transferred by suitable conveying means (not shown) to the grain tank.

Figure 3:
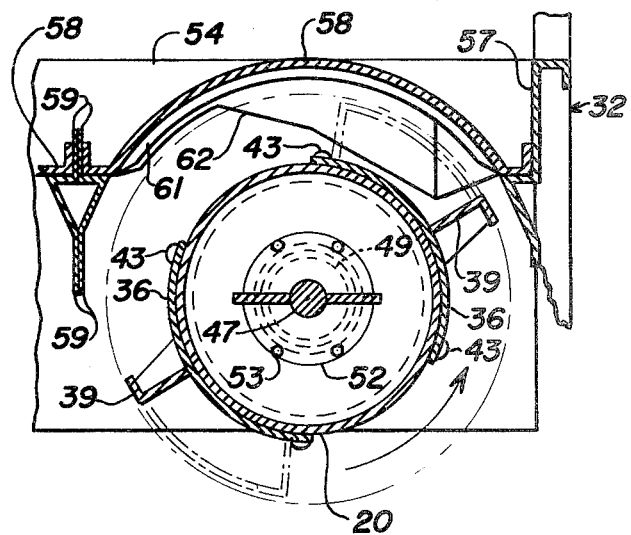
FIG. 3 is an end elevation view of a vertical section of one of the rotors and the corresponding portions of the rotor casing taken along the line 3—3 of FIG. 2 showing the interaction of the rotor separator blades with the crop material axial flow inhibiting means and the tapered flow inhibiting means.
Figure 4:
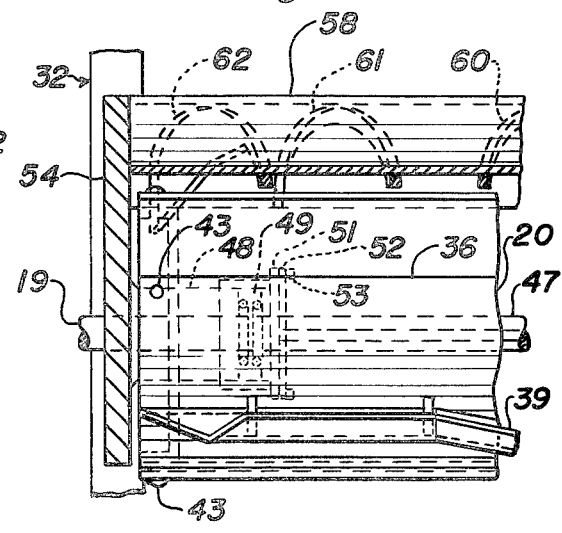
FIG. 4 is a side elevation view of the rear of one of the rotors in the rotor casing taken along the line 4—4 in FIG. 2.

Rearwardly of the threshing portions of the rotors 20 are the separating portions. Attached to each of the rotors 20 in this area are separator blades 39. As best seen in FIGS. 3 and 4, the blades 39 are welded or otherwise fixedly secured to generally rectangularly shaped weld assembly plates 36 which are molded to the cylindrical shape of the rotors 20 over which they are mounted. The weld assembly plates 39 then are securely fastened to the rotors 20 by means of bolts 43 or other suitable fasteners. The separator blades 39 may be either straight or angularly disposed so that they cooperate with the separating grates, indicated generally by the numeral 40, in the forward portion of the separating area to separate any grain still left in the crop material. The grates 40 are generally of a wider mesh than the concaves 38 of the threshing portion of rotor casing 32. The separating grates 40 terminate at location 41 in FIG. 1 where the discharge opening from the rotor casing permits the remaining crop material to be deflected downwardly toward the beater paddle 44 and discharge beater grate assembly 30 in an area commonly referred to as an auxilliary separating area. The assembly 30 receives the residue crop material and conveys it rearwardly for ultimate discharge from the combine 10. The structure thus far has been described generally since it is old and well known in the art. This structure and the interrelationships between the various operating components of the combine are described in greater detail in U.S. Pat. Nos. 3,626,472 issued Dec. 7, 1971, 3,742,686 issued July 3, 1973, and 3,995,645 issued Dec. 7, 1976, all to Rowland-Hill, hereinafter specifically incorporated by reference in their entirety.

Figure 2:
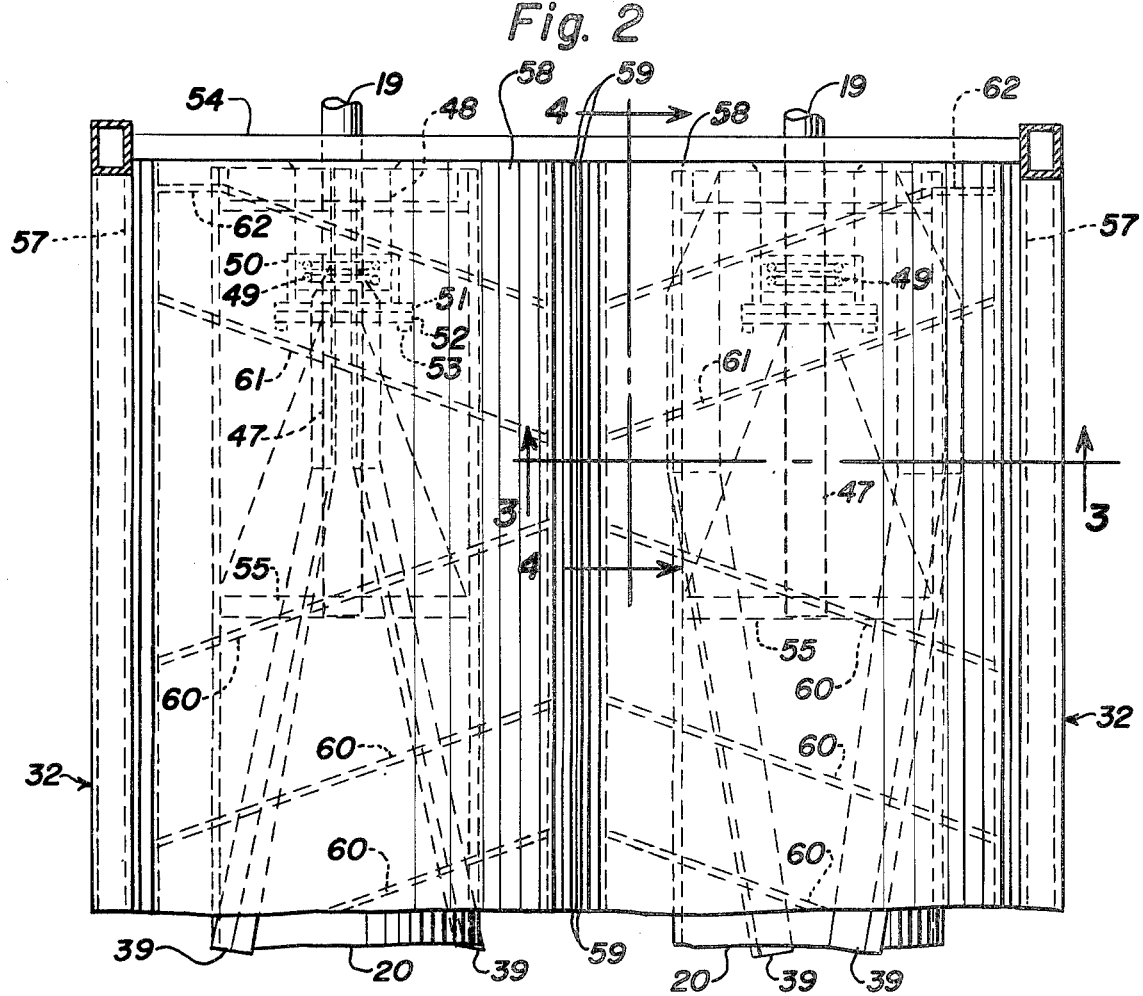
FIG. 2 is an enlarged top plan view of a section of the separation portions of the threshing and separating rotors taken along the line 2—2 of FIG. 1.

As shown in FIG. 1, the rotors 20 are mounted to a pair of stub shafts at their forward and rearward ends, indicated by the numerals 45 and 47, respectively. The rear rotor shafts 47 are best seen in FIGS. 2, 3 and 4. FIG. 2 shows the bearing cover sleeve 48 to which is suitably attached the bearing assembly 49, contained within the bearing housing 50. The bearing housing 50 is suitably fastened to a retaining plate 51 which combines with coupling plate 52 to form a coupler between the drive shaft 19 and the stub shaft 47 when the aforementioned plates 51 and 52 are fastened by bolts or some other suitable fasteners 53. The stub shaft 47 is suitably fastened or piloted to an anchoring plate 55 spanning the inner diameter of the rotor 20. The drive shaft 19 projects through an appropriately sized and shaped aperture (not shown) in the bulkhead 54, which is a structural element of the main combine support frame 24. Alternately, this drive shaft-bearing-coupling assembly could be accomplished by utilizing a gearbox with the drive shaft 19 connected to the stub shaft 47 by means of a chain coupling employing chain sprockets on the contiguous ends of the respective shafts. This alternate assembly is not shown since it is old and well known by those skilled in the art.

The rotor casing 32 is comprised of two separate elongated rotor housings 57 with cover plates 58, best seen in FIG. 2. Centerline of the casing 32, as seen briefly in FIG. 3, the cover plates 58 are supported by interfacing support brackets 59 suitably fastened both together and to the cover plates 58 in a rigid manner. The concavely shaped cover plates 58 in FIGS. 2 and 4 have affixed to their undersides, spaced apart at uniformly predetermined intervals, crop material axial flow facilitating means or transport fins 60. These flow facilitating means 60 are attached in a partially helical or spiral pattern substantially the entire length of the cover plates so that the crop material is guided rearwardly in a generally spiral or helical axial path about the rotors 20 during the threshing and separating process. At the rear of the rotor housings 57 where the discharge opening, at location 41 in FIG. 1, occurs this helical pattern is interrupted and the pattern is reversed. The reversal occurs in the form of axial flow inhibiting means 61 and tapered flow inhibiting means 62. Inhibiting means 61 are of the same general configuration as the facilitating means 60, but of reverse orientation. The facilitating means 60 and the inhibiting means 61 can be either rounded or rectangularly shaped rods or fins approximately ⅜ of an inch in relief from the underside of the cover plates 58. The tapered flow inhibiting means 62 are immediately to the rear of inhibiting means 61 and of the same orientation. Tapered inhibiting means 62 are contoured in shape to closely follow the silhouette of the angularly disposed separator blades 39 as the blades 39 rotate on the rotors 20. This contoured shape permits the tapered inhibiting means 62 to effectively function as strippers to the crop material flowing axially rearwardly as it comes off of the separator blades 39. The inhibiting means 61, because of their location and orientation, serve to decelerate the crop material as it moves rearwardly and deflect it generally downwardly through the discharge opening toward the beater paddle 41 and into an auxiliary separating area. The tapered inhibiting means 62, because of their contoured shape plus their location and orientation, serve as further and more effective crop decelerators and deflectors. Additionally, they act in a positive manner by effectively stripping the crop material from the separator blades 39 as described above, thus further minimizing the opportunity for material wrappage to occur and ensuring that all of the remaining crop material in the rotor casing 32 at that point is deflected downwardly toward the beater paddle 44 and into the aforementioned auxiliary separating area.

In operation, the combine 10 is propelled across a field with uncut crop by the power transmitted from the engine 14. The header 21 serves to cut the standing crop material, consolidate it and transfer it rearwardly and upwardly into the infeed housing 22. The crop elevator 34 within the infeed housing 22 then continues to rearwardly and upwardly move the crop material into the inlet area of the rotor casing 32, where the auger flightings 35 on the forward ends of the rotors 20 engage the crop material and initiate spiral axial movement. The cut crop material is thusly transferred rearwardly by the flightings 35 to the threshing portions of the rotors 20 where the rasping means 37 commence the threshing process in cooperation with the concaves 38. The axial flow facilitating means or transport fins 60 spiralled about the upper portion of the rotor casing 32 on the underside of the cover plates 58 aid in the rearward axial movement of the crop material about the rotors 20. The crop material continues in this spirally axial movement rearwardly into the separating portions of the rotor casing where the separator blades 39 of each rotor cooperate with the separating grates 40 to further remove the grain from the crop material. At the bottom and rearmost portion of the rotor casing 32 there is a discharge outlet that leads to the beater paddle 44, discharge beater grate assembly 30 and the auxiliary separating area. The crop material is retarded or inhibited in its rearward flow by the reversed axial flow inhibiting means 61. The tapered flow inhibiting means 62 further retard this rearward flow and positively strip the crop material from the separator blades 39. These inhibiting means 61 and tapered inhibiting means 62 jointly decelerate the rearward movement of the crop material and deflect it downwardly into and through the discharge outlet, thereby precluding the crop material from continuing its rearward movement and potentially becoming wrapped about the rotor shafts 19 and the bearing sleeves 48.

While the preferred structure in which the principles of the present invention have been incorporated is shown and described above it is to be understood that the invention is not to be limited to the particular details thus presented, but in fact, widely different means may be employed in the practice of the broader aspects of this invention. The scope of the appended claims is intended to encompass all obvious changes in the details, materials and arrangement of parts which will occur to one of skill in the art upon a reading of the disclosure.

Having thus described the invention, what is claimed is:

1. In a crop harvesting and threshing machine with axial flow threshing and separation having:
   (a) a casing with an infeed area to receive crop material and a discharge area with a suitable outlet to dispose of the crop material residue defining therebetween a generally axial path, the casing further having an upper portion of solid periphery and a lower portion;
   (b) a rotatable threshing and separating member within the casing extending generally rearwardly from the infeed area to the discharge area, and about which crop material axially flows;
   (c) shaft means protruding from one end of the threshing and separating member adjacent the discharge area and about which the threshing and separating member is rotatably supported and driven;
   (d) drive means for rotating the threshing and separating member;
   (e) rasping means affixed to the threshing cylinder at predetermined spaced intervals;
   (f) separator means affixed to the threshing and separating member rearwardly of the rasping means and adjacent the discharge area for separating the grain from the residue;
   (g) a concave of predetermined length supported by the lower portion of the casing for cooperation with the rasping means thereby defining a threshing region;
   (h) a separating assembly of predetermined length supported by the lower portion of the casing and rearwardly of the concave cooperatively interacting with the separator means to thereby define a separating region;
   (i) truncated generally helical crop transport means attached to the upper portion of the casing at predetermined intervals to facilitate the axial flow of the crop material about the threshing and separating member as the crop material moves from the infeed area of the casing rearwardly toward the discharge area;
   (j) a plurality of crop material flow inhibiting means affixed to the upper portion of the casing adjacent the discharge end in a reverse generally helical pattern to the crop transport means comprising at least a first member and a second member, the first member being generally elongate, the second member being contoured in shape to conform to the shape of the separator means as the separator means rotates on the threshing and separating member about the shaft means so that the crop material axially transported from the infeed area to the discharge area is decelerated and stripped from the separator means and deflected into the discharge outlet such that it is prevented from wrapping about the shaft means.

2. In a crop harvesting and threshing machine having a mobile frame with a longitudinal axis, at least one threshing and separating member supported on the frame for rotation about an axis extending substantially parallel to said longitudinal axis between a first end and a spaced second end thereof by means including a shaft on the second end, the shaft and the second end of the member defining a junction, separating means affixed to the member, a casing surrounding a substantial portion of the member, the casing including an upper substantially closed portion and a lower portion having a discharge area adjacent the junction, the member and the casing cooperating to direct crop material toward the second end from the first end, and drive means therefor, the improvement comprising:

a plurality of crop material flow inhibiting means attached to the upper portion of said rotor casing adjacent the junction so that the crop material is decelerated, stripped from the separating means and deflected into the discharge area without reaching the junction.

3. In a crop harvesting and threshing machine, according to claim 2, wherein the upper portion of the casing further includes axial flow facilitating means affixed thereto in predetermined intervals between the first end and the second end in a truncated generally helical pattern from the first end towards the second end enhancing the cooperative material directing flow of the threshing and separating member in the casing, the casing further having said plurality of flow inhibiting means affixed thereto in a truncated generally helical pattern opposite to the flow facilitating means.

4. In a crop harvesting and threshing machine, according to claim 3, wherein the plurality of crop material flow inhibiting means comprises at least a first member and a spaced apart second member, the first member decelerating the crop material and generally deflecting it into the discharge area, the second member additionally stripping the crop material from the separating means while decelerating and deflecting the material into the discharge area.

5. In a crop harvesting and threshing machine, according to claim 4, wherein the second member of the flow inhibiting means is contoured in shape to conform to the shape of the separator means as the separator means rotates on the threshing and separating member about the shaft.

6. In a crop harvesting and threshing machine, according to claim 5, wherein the contoured second member increases in radially extending reach from the threshing and separating member as it extends along the member toward the second end until it obtains a uniform radial extension that permits it to strip the crop material from the separating means of the threshing and separating member adjacent the discharge area so that the crop material is deflected toward the discharge area.

7. In a crop harvesting and threshing machine, according to claim 6, wherein the first flow inhibiting member comprises a continuous elongate rib affixed to the closed portion of the casing and protruding toward the threshing and separating member, and spaced therefrom.

8. In a crop harvesting machine, according to claim 7, wherein the rib protrudes about ⅜ of an inch from the closed portion of the casing.

* * * * *